United States Patent
Aoki

(10) Patent No.: US 8,801,021 B2
(45) Date of Patent: Aug. 12, 2014

(54) FRONT FORK SPRING LEG

(71) Applicant: Showa Corporation, Gyoda (JP)

(72) Inventor: Yasuhiro Aoki, Fukuroi (JP)

(73) Assignee: Showa Corporation, Gyoda (JP)

( * ) Notice: Subject to any disclaimer, the term of this patent is extended or adjusted under 35 U.S.C. 154(b) by 0 days.

(21) Appl. No.: 13/720,354

(22) Filed: Dec. 19, 2012

(65) Prior Publication Data

US 2013/0221634 A1  Aug. 29, 2013

(30) Foreign Application Priority Data

Feb. 29, 2012 (JP) .................................. 2012-043358

(51) Int. Cl.
*B62K 25/08* (2006.01)

(52) U.S. Cl.
USPC ........................................................ 280/276

(58) Field of Classification Search
USPC ................ 280/276, 277; 188/322.16, 322.17, 188/322.18
See application file for complete search history.

(56) References Cited

U.S. PATENT DOCUMENTS

| | | | |
|---|---|---|---|
| 4,647,025 A | 3/1987 | Gold | |
| 4,881,750 A * | 11/1989 | Hartmann | 280/276 |
| 6,105,988 A | 8/2000 | Turner et al. | |
| 6,217,049 B1 * | 4/2001 | Becker | 280/276 |
| 7,401,800 B2 * | 7/2008 | Jordan | 280/276 |
| 7,722,069 B2 * | 5/2010 | Shirai | 280/276 |
| 2008/0041681 A1 * | 2/2008 | Shipman | 188/319.2 |
| 2010/0207350 A1 * | 8/2010 | Uchiyama et al. | 280/276 |
| 2011/0084464 A1 * | 4/2011 | Inoue et al. | 280/276 |

FOREIGN PATENT DOCUMENTS

| | | |
|---|---|---|
| JP | 49-1162 Y | 1/1974 |
| JP | 06-1091 B2 | 1/1994 |
| JP | 2001-501155 A | 1/2001 |
| JP | 2010-242783 A | 10/2010 |
| JP | 2012-092945 A | 5/2012 |

* cited by examiner

*Primary Examiner* — Tony Winner
(74) *Attorney, Agent, or Firm* — Leason Ellis LLP

(57) ABSTRACT

A front fork spring leg, which is capable of stably maintaining air spring, has an inward-facing seal member, an outward-facing seal member, and a piston ring arranged on an outer periphery of a guide of a guide rod sequentially in this order along an axial direction of the guide from a side close to an inner air spring chamber toward a side far from the inner air spring chamber. The inward-facing seal member has a lip which is slidably in contact with an inner periphery of the guide cylinder, with this lip being oriented toward the inner air spring chamber. The outward-facing seal member has a lip which is slidably in contact with the inner periphery of the guide cylinder, with this lip being oriented in an opposite direction to the inner air spring chamber.

7 Claims, 8 Drawing Sheets

FRONT FORK SPRING LEG

CROSS-REFERENCE TO RELATED PATENT APPLICATIONS

This application claims the benefit of Japanese Patent Application No. 2012-043358, filed Feb. 29, 2012, which is incorporated by reference herein.

FIELD OF THE INVENTION

This invention relates to a front fork spring leg suitable for use in a motorcycle or the like.

BACKGROUND OF THE INVENTION

One conventional front fork comprises, as described in Japanese Examined Utility Model Application Publication No. S49-1162, a spring leg which does not have a built-in damper but have a built-in suspension spring formed of a metal spring for suspending a vehicle weight.

The applicant of this invention proposes, as described in Japanese Patent Application Laid-Open (kokai) No. 2012-092945, to use an air spring as the suspension spring incorporated in a spring leg in order to reduce the weight of the front fork and to reduce the vehicle weight.

The spring leg described in Japanese Patent Application Laid-Open (kokai) No. 2012-092945 is configured such that a vehicle body-side tube and an axle-side tube are inserted into each other, a guide cylinder is provided at a central portion of the inside of either one of the vehicle body-side tube or the axle-side tube, a guide rod is provided at a central portion of the inside of the other of the vehicle body-side tube and the axle-side tube, a guide of the guide rod being inserted into the guide cylinder, a piston ring and a seal member are provided on an outer periphery of the guide of the guide rod so as to be slidably in contact with an inner periphery of the guide cylinder, and an inner air spring chamber defined by the guide of the guide rod is formed in the inside of the guide cylinder.

[Patent document 1] Japanese Examined Utility Model Application Publication No. S49-1162

[Patent document 2] Japanese Patent Application Laid-Open (kokai) No. 2012-092945

In the spring leg described in Japanese Patent Application Laid-Open (kokai) No. 2012-092945, there are provided, on the outer periphery of the guide rod, an inward-facing seal member, a piston ring, and an outward-facing seal member sequentially in this order along an axial direction of the guide from the side close to the inner air spring chamber to the side far from it.

The inward-facing seal member has a lip that is slidably in contact with the inner periphery of the guide cylinder and is oriented toward the inner air spring chamber, and the outward-facing seal member has a lip that is slidably in contact with the inner periphery of the guide cylinder and is oriented in the opposite direction from the inner air spring chamber. According to this arrangement, the inward-facing seal member is opened by an air pressure in the inner air spring chamber to prevent leakage of the air pressure and to maintain a spring force of the air spring in the inner air spring chamber. The outward-facing seal member prevents a lubricating oil located in a lower part of the guide cylinder from entering the inner air spring chamber and prevents the air pressure in the inner air spring chamber from being increased to a critical pressure by the increase of the oil entering the chamber.

However, in the spring leg described in the Japanese Patent Application Laid-Open (kokai) No. 2012-092945, the piston ring is located between the inward-facing seal member and the outward-facing seal member on the outer periphery of the guide of the guide rod, and this piston ring produces abrasive dust. The abrasive dust from the piston ring can move both toward and against the inner air spring chamber in the inside of the guide cylinder, depending on orientations of the lips of the inward-facing seal member and the outward-facing seal member, and may scratch the inward-facing seal member and the outward-facing seal member in the course of the movement. If the inward-facing seal member is scratched, a sealability of the inward-facing seal member will be impaired, which will reduce the spring force of the air spring in the inner air spring chamber, possibly leading to an impaired suspension function. If the outward-facing seal member is scratched, a sealability of the outward-facing seal member will be impaired, which will cause the lubricating oil in the lower part of the guide cylinder to enter the inner air spring chamber, and the air pressure in the inner air spring chamber will be increased to the critical pressure by the increase of the oil entering into the chamber.

SUMMARY OF THE INVENTION

An object of the invention is to provide a front fork spring leg capable of stably maintaining its air spring characteristics.

An aspect of the invention according to one embodiment (embodiment 1) is a front fork spring leg including: a vehicle body-side tube and an axle-side tube inserted into each other; a guide cylinder provided at a central portion of the inside of one of the vehicle body-side tube and the axle-side tube; a guide of a guide rod provided at a central portion of the inside of the other one of the vehicle body-side tube and the axle-side tube, with the guide being inserted into the guide cylinder; a piston ring and a sealing member provided on an outer periphery of the guide of the guide rod so as to be slidably in contact with the inner periphery of the guide cylinder; and an inner air spring chamber formed in the inside of the guide cylinder by being defined by the guide of the guide rod, wherein; an inward-facing seal member, an outward-facing seal member, and the piston ring are arranged on the outer periphery of the guide of the guide rod sequentially in this order along the axial direction of the guide from the side close to the inner air spring chamber toward the side far from the same; and the inward-facing seal member has a lip that is slidably in contact with the inner periphery of the guide cylinder, with this lip being oriented toward the inner air spring chamber while the outward-facing seal member has a lip that is slidably in contact with the inner periphery of the guide cylinder, with this lip being oriented in the opposite direction to the inner air spring chamber.

The invention according to another embodiment (embodiment 2) relates to the front fork spring leg according to claim 1, wherein the outward-facing seal member is provided in plurality at a plurality of positions along an axial direction on the outer periphery of the guide of the guide rod.

The invention according to another embodiment (embodiment 3) relates to the front fork spring leg according to embodiment 1 or 2, wherein the vehicle body-side tube and the axle-side tube form an outer air spring chamber at least on the outside of the inner air spring chamber within the guide cylinder, and an oil chamber filled with a lubricating oil is formed in a lower part of the outer air spring chamber.

The invention according to another embodiment (embodiment 4) relates to the front fork spring leg according to any one of embodiments 1 to 3, having, in the inside of the guide cylinder, a rebound air spring chamber interposed and defined between a rod guide provided on the guide cylinder to receive and support the guide rod inserted into the rod guide, and the guide of the guide rod inserted into the guide cylinder.

Embodiment 1

(a) An inward-facing seal member, an outward-facing seal member, and a piston ring are arranged on an outer periphery of a guide of a guide rod sequentially in this order along an axial direction of the guide from the side close to an inner air spring chamber toward the side far from the same.

Accordingly, no abrasive dust from the piston ring will be moved toward the inward-facing seal member, passing the outer periphery of a lip of the outward-facing seal member due to an orientation of the lip. As a result, the inward-facing seal member is prevented from being scratched by the abrasive dust from the piston ring, a sealability of the inward-facing seal member can be ensured, and leakage of an air pressure from the inner air spring chamber is prevented. Thus, the spring force of the air spring in the inner air spring chamber can be maintained stably, and a suspension function is not impaired.

Further, it can be ensured that no abrasive dust from the piston ring will pass an outer periphery of a lip of the outward-facing seal member due to the orientation of the lip. This makes it possible to prevent the outward-facing seal member from being scratched by the abrasive dust from the piston ring, to ensure the sealability of the outward-facing seal member, to prevent a lubricating oil in the lower part of the outer air spring chamber from entering the inner air spring chamber, and hence to prevent an air pressure in the inner air spring chamber from raising to a critical pressure.

Embodiment 2

(b) The outward-facing seal member described in (a) above is arranged in plurality at a plurality of positions along an axial direction on the outer periphery of the guide of the guide rod. This makes it possible to further prevent the abrasive dust from the piston ring from passing the outer peripheries of the lips of the plurality of outward-facing seal members arranged in series, and to prevent the inward-facing seal member and the outward-facing seal member from being scratched by the abrasive dust from the piston ring more reliably.

Embodiment 3

(c) The vehicle body-side tube and the axle-side tube form an outer air spring chamber at least on the outside of the inner air spring chamber within a guide cylinder, and an oil chamber filled with the lubricating oil is formed in a lower part of the outer air spring chamber. A large amount of the lubricating oil in the lower part of the outer air spring chamber can be prevented from entering the inner air spring chamber by the features (a) and (b) described above.

Embodiment 4

(d) There is provided, in the inside of the guide cylinder, a rebound air spring chamber interposed and defined between a rod guide provided on the guide cylinder for receiving and supporting the guide rod inserted therein, and the guide of the guide rod inserted in the guide cylinder. The abrasive dust from the piston ring can be prevented, by the features (a) and (b), from passing the outer periphery of the lip of the outward-facing seal member due to an air pressure in the rebound air spring chamber becoming high on the extended side during an extension stroke.

DETAILED DESCRIPTION OF THE INVENTION

Preferred Embodiments

First Embodiment (FIGS. 1 to 4)

Figure 1:
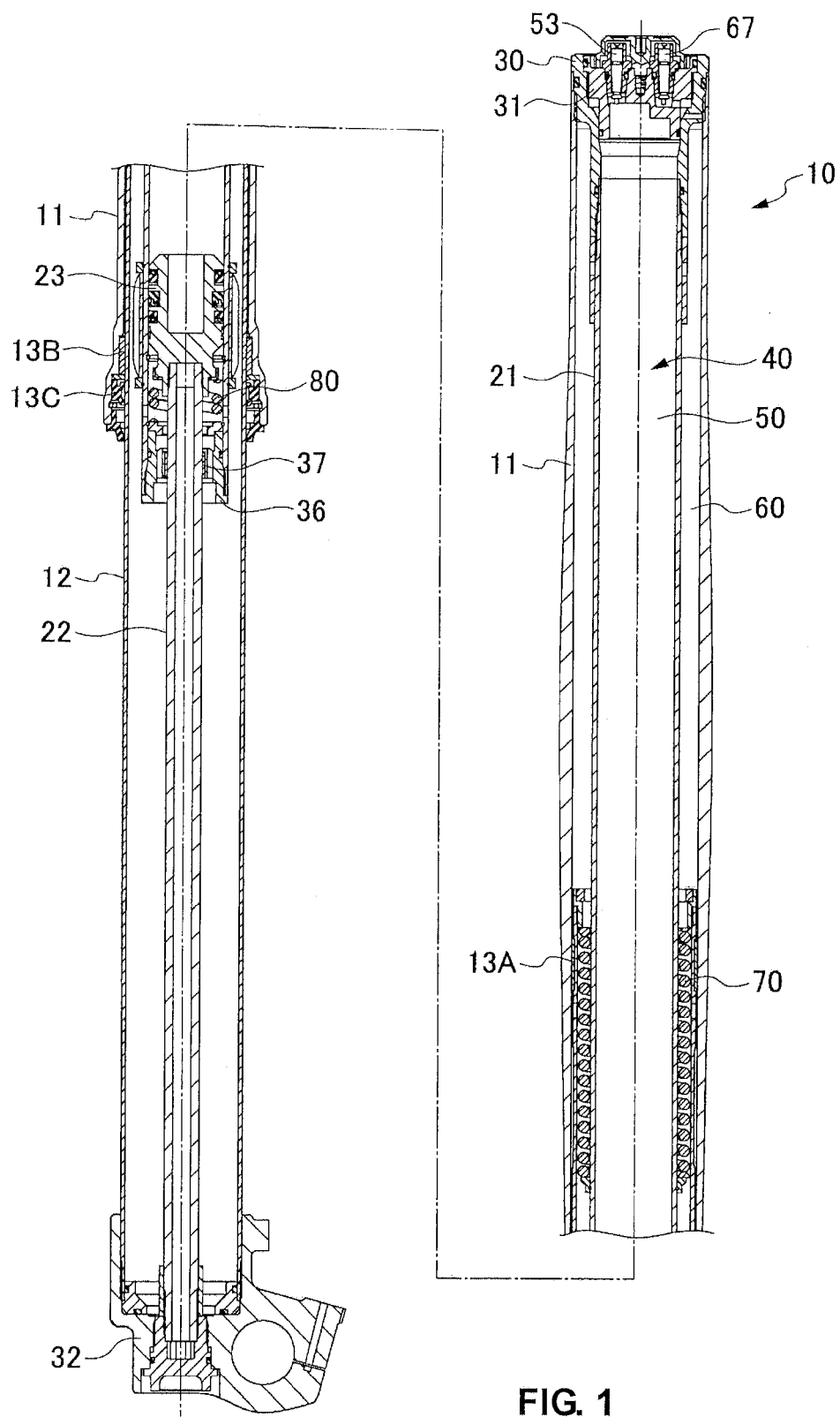
FIG. 1 is a general cross-sectional view showing a front fork spring leg according to a first embodiment.
Figure 2:
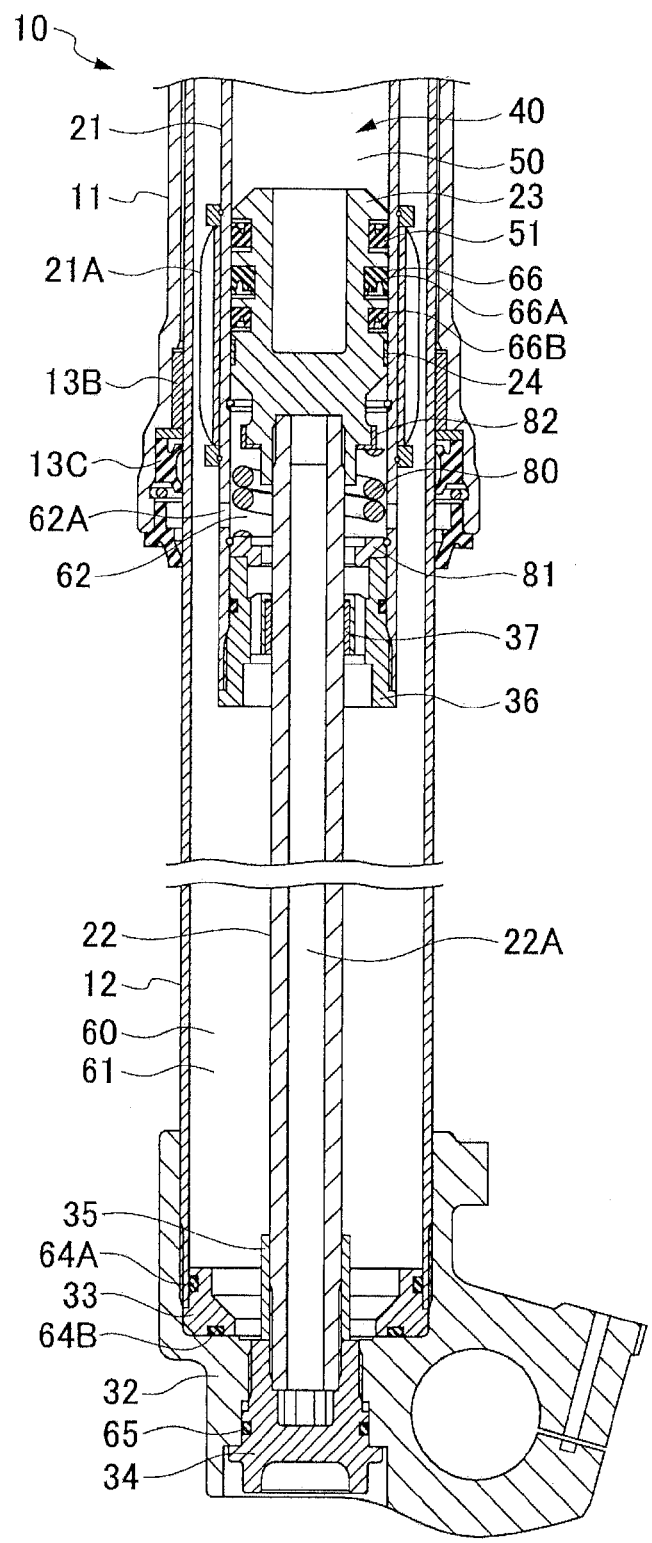
FIG. 2 is a cross-sectional view showing a lower part of FIG. 1.
Figure 3:
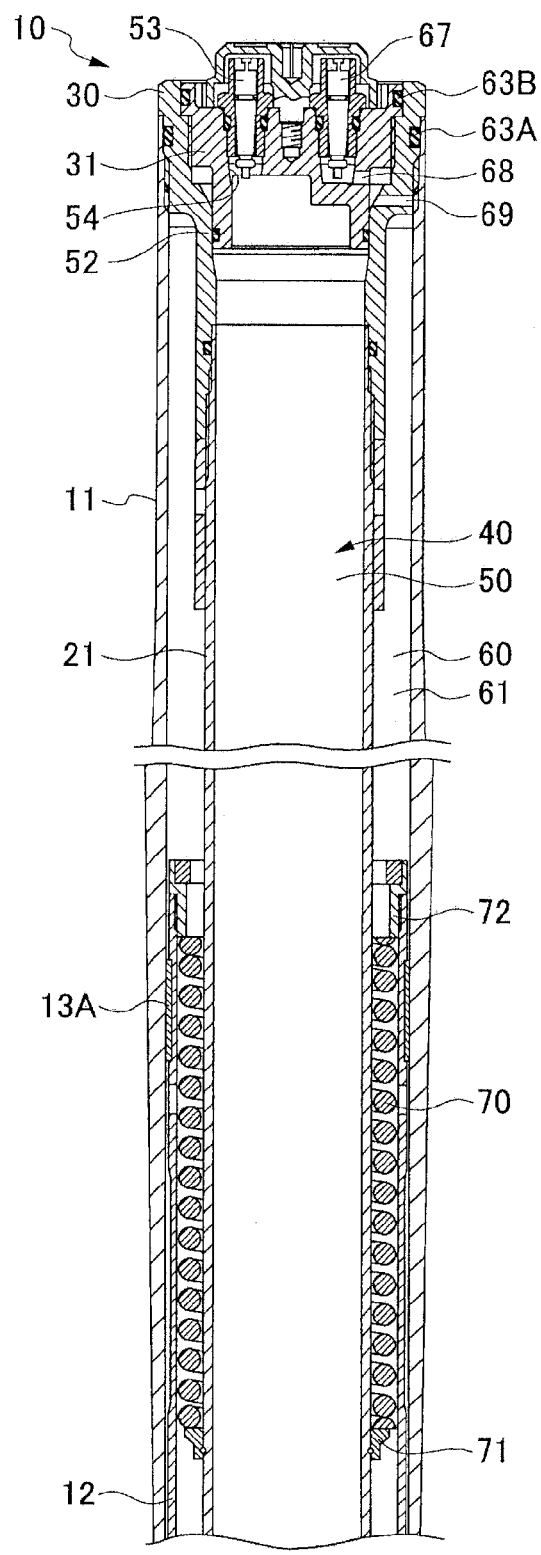
FIG. 3 is a cross-sectional view showing an upper part of FIG. 1.

A spring leg 10 according to a first embodiment of the invention shown in FIGS. 1 to 3 constitutes at least one of right and left legs of a front fork of a motorcycle or the like. This spring leg 10 has no built-in damper, but has a built-in suspension spring formed of an air spring. The other leg of the front fork is formed of a damper leg having a built-in damper but having no built-in suspension spring. However, the other leg may be a spring leg similar to the spring leg 10.

As shown in FIGS. 1 to 3, the spring leg 10 is formed by inserting an axle-side tube (inner tube) 12 into a vehicle body-side tube (outer tube) 11 in a slidable manner while interposing bushes 13A, 13B therebetween and being sealed with a seal member 13C. The spring leg 10 has a guide cylinder 21 that is suspended at a central portion of the inside of the vehicle body-side tube 11, and a guide rod 22 that is erected at a central portion of the inside of the axle-side tube 12. The guide rod 22 has a front end guide 23 which is slidably inserted into the guide cylinder 21. A piston ring 24 is attached onto an outer periphery of the front end guide 23 of the guide rod 22 so as to be slidably in contact with an inner periphery of the guide cylinder 21.

The vehicle body-side tube 11 is supported on a vehicle body side, while the axle-side tube 12 is joined to an axle. An upper open end of the vehicle body-side tube 11 is closed and sealed with a cap 30 and a fork bolt 31. The guide cylinder 21 is connected to and suspended from a lower end of the cap 30. An anti-vibration collar 21A is attached to an outer periphery of a lower end of the guide cylinder 21 while defining an annular gap with an inner periphery of the axle-side tube 12.

An axle bracket 32 is screwed to and sealed at a lower end of the axle-side tube 12, and an bottom piece 33 is interposed and held between the lower end of the axle-side tube 12 and a bottom face of the axle bracket 32. A lower end of the guide rod 22 is erected in a central part of the axle bracket 32 in the inside of the axle-side tube 12. The lower end of the guide rod 22 is screw attached to a bottom bolt 34 that is engaged into the bottom of the axle bracket 32 from the outside and sealed. The lower end of the guide rod 22 is also fastened by a lock nut 35. The guide rod 22 is slidably supported by a bush 37 of a rod guide 36 that is screw attached to the lower open end of the guide cylinder 21, and is inserted into the inside of the guide cylinder 21. The guide 23 is screw attached to the front end of the guide rod 22 inserted into the guide cylinder 21.

The spring leg 10 has, in the inside of the guide cylinder 21, an inner air spring chamber 50 defined by the front end guide 23 of the guide rod 22 and an outer air spring chamber 60 which is defined by the vehicle body-side tube 11 and the axle-side tube 12 at least on the outside of the inner air spring chamber 50 within the guide cylinder 21. There is thus formed, in the spring leg 10, a suspension spring 40 by an air spring in the inner air spring chamber 50 and an air spring in the outer air spring chamber 60.

The inner air spring chamber 50 is defined in the inside of the guide cylinder 21 on the side where the guide rod 22 is not located, such that it is interposed between the fork bolt 31 and the front end guide 23 of the guide rod 22. The inner air spring chamber 50 is hermetically sealed by a seal member 51 provided on the front end guide 23 to face the inner periphery of the guide cylinder 21 and a seal member 52 provided on the fork bolt 31 to face an inner periphery of the cap 30.

An air pressure in the inner air spring chamber 50 is regulated by an inner air pressure regulator 53. The inner air pressure regulator 53 is formed of an air valve attached to the fork bolt 31 at a position facing the outside. The inner air pressure regulator 53 communicates with the inner air spring chamber 50 through a hole 54 formed through the fork bolt 31, and regulates the air pressure sealed in the inner air spring chamber 50. The inner air pressure regulator 53 may be formed of a rubber film that can be perforated by a needle of an air pressure injector.

The outer air spring chamber 60 is composed of a space 61 that is defined by the vehicle body-side tube 11 and the axle-side tube 12 outside of the guide cylinder 21, and a space 62 that is defined, in the inside of the guide cylinder 21 on the side where the guide rod 22 is located, by being interposed and defined between the front end guide 23 of the guide rod 22 and the rod guide 36 which receives and supports the guide rod 22 inserted therein. The space 62 communicates with the space 61 through a hole 62A formed in the guide cylinder 21. In this embodiment, a hollow portion 22A of the guide rod 22 is also included in the space 62. The vehicle body-side tube 11 and the axle-side tube 12 hermetically slide on each other with the seal member 13C being interposed between their sliding portions. An upper part of the space 61 (including holes 68, 69 to be described later) is hermetically sealed by a seal member 63A provided on the cap 30 to face the inner periphery of the vehicle body-side tube 11 and a seal member 63B provided on the fork bolt 31 to face the inner periphery of the cap 30. A lower part of the space 61 is hermetically sealed by seal members 64A, 64B provided on the bottom piece 33 to face the inner periphery of the axle-side tube 12 and the bottom face of the axle bracket 32, and a seal member 65 provided on the bottom bolt 34 to face an inner periphery of the axle bracket 32. The space 62 is hermetically sealed by a seal member 66 provided on the front end guide 23 to face the inner periphery of the guide cylinder 21.

The outer air spring chamber 60 may be composed only of the space 61. In this case, the space 62 does not communicate with the space 61 and can be open to the atmosphere through a hollow portion 22A of the guide rod 22.

An air pressure in the outer air spring chamber 60 is regulated by an outer air pressure regulator 67. The outer air pressure regulator 67 is formed of an air valve attached to the fork bolt 31 at a position facing the outside, and communicates with the space 61 and hence with the space 62 via a hole 68 formed in the fork bolt 31, an annular gap between the cap 30 and the fork bolt 31, and a hole 69 formed in the cap 30 so that the air pressure sealed in the outer air spring chamber 60 (spaces 61 and 62) is regulated. The outer air pressure regulator 67 may be formed of a rubber film that can be perforated by a needle of an air pressure injector.

The spring leg 10 forms an air spring with each of the inner air spring chamber 50 and the outer air spring chamber 60 compressed during a compression stroke. A spring force F1 of the air spring in the inner air spring chamber 50 and a spring force F2 of the air spring in the outer air spring chamber 60 bias the vehicle body-side tube 11 and the axle-side tube 12, respectively, in a direction to extend.

The spring leg 10 may have an oil chamber that is formed in a lower part of the outer air spring chamber 60 and filled with a lubricating oil. This lubricating oil lubricates the sliding portion between the vehicle body-side tube 11 and the axle-side tube 12, and the sliding portion between the guide cylinder 21 and the guide rod 22.

The spring leg 10 has, in the outside of the guide cylinder 21, a balance spring 70 interposed between a spring bearing 71 provided on an outer periphery of the guide cylinder 21 and a spring bearing 72 provided at an upper open end of the axle-side tube 12 having the guide rod 22 provided to erect therefrom. The balance spring 70 is formed of a metal coil spring. A spring force Fb of the metal spring of the balance spring 70 is compressed on the extended side where the vehicle body-side tube 11 and the axle-side tube 12 are biased by the spring forces F1 and F2 of the air springs in the inner air spring chamber 50 and outer air spring chamber 60, and the spring force Fb biases the vehicle body-side tube 111 and the axle-side tube 12 against the spring force F1 of the air spring in the inner air spring chamber 50 and the spring force F2 of the air spring in the outer air spring chamber 60 in a direction to compress them.

The spring leg 10 has, in the inside of the guide cylinder 21, a rebound spring 80 interposed between a spring bearing 81 provided on an inner end face of the rod guide 36 which is provided in the guide cylinder 21 so as to receive and support the guide rod 22 inserted therein, and a spring bearing 82 abutting against the front end guide 23 of the guide rod 22 inserted into the guide cylinder 21 (that is, in the aforementioned space 62). The rebound spring 80 is formed of a metal coil spring. A spring force Fr of the metal spring of the rebound spring 80 is compressed on the extended side where the vehicle body-side tube 11 and the axle-side tube 12 are biased by the spring forces F1 and F2 of the air springs in the inner air spring chamber 50 and outer air spring chamber 60, and the spring force Fr biases the vehicle body-side tube 11 and the axle-side tube 12 against the spring force F1 of the air spring in the inner air spring chamber 50 and the spring force F2 of the air spring in the outer air spring chamber 60 in a direction to compress them.

Accordingly, in this front fork, a combined spring force F is produced during extension and compression strokes of the spring leg 10, the combined spring force F being obtained by summing up the spring force F1 of the air spring in the inner air spring chamber 50 and the spring force F2 of the air spring in the outer air spring chamber 60 which bias the vehicle body-side tube 11 and the axle-side tube 12 in a direction to extend them, and the spring force Fb of the metal spring of the balance spring 70 and the spring force Fr of the metal spring of the rebound spring 80 which bias the vehicle body-side tube 11 and axle-side tube 12 on the extended side in a direction to compress them. The combined spring force F functions to increase the spring force in the second half of the compressed side without increasing the spring force in the initial to intermediate regions of the extended side of the extension and compression strokes.

Further, in the front fork, extending and compressing vibration of the vehicle body-side tube 11 and the vehicle body-side tube 12 caused by absorption of an impact force by the combined spring force F of the spring leg 10 is damped by a damping force generated by an extension-side damping force generator and a compression-side damping force generator in the damper of the damper leg.

The spring leg 10 is configured as described below in order to stably maintain air spring characteristics.

As described in the above, the spring leg 10 has the piston ring 24 and seal members 51, 66 provided on the outer periphery of the guide rod 22 so as to be slidably in contact with the inner periphery of the guide cylinder 21, and the inner air spring chamber 50 defined by the front end guide 23 of the guide rod 22 in the inside of the guide cylinder 21.

Figure 4:
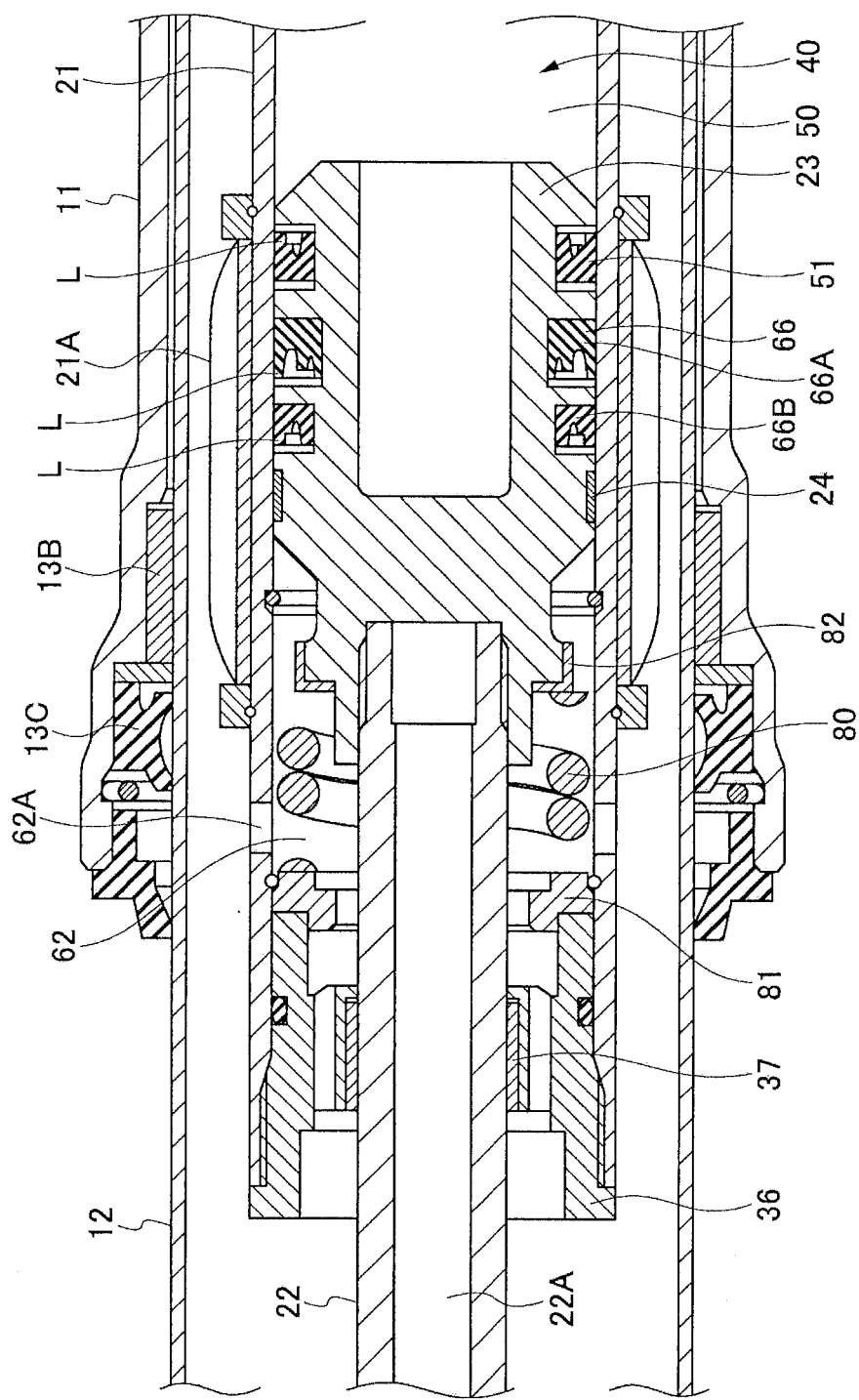
FIG. 4 is a schematic diagram showing a configuration of the outer periphery of a guide of a guide rod.

According to this configuration, as shown in FIG. 4, the spring leg 10 has, on the outer periphery of the front end guide 23 of the guide rod 22, an inward-facing seal member 51, an outward-facing seal member 66, and a piston ring 24 provided sequentially in this order along an axial direction of the guide 23 from the side close to the inner air spring chamber 50 to the side far from it.

In this embodiment, two (or three or more) adjacent outward-facing seal members 66A and 66B are provided as the outward-facing seal member 66, and these outward-facing seal members 66A, 66B are provided at two positions along an axial direction on the outer periphery of the front end guide 23. The inward-facing seal member 51 and the outward-facing seal members 66A, 66B are respectively embedded in annular grooves formed at four positions in an axial direction on the outer periphery of the front end guide 23. Two (or three or more) adjacent inward-facing seal members 51A and 51B (not shown) may be provided as the inward-facing seal member 51.

The inward-facing seal member 51 has a lip L slidably in contact with the inner periphery of the guide cylinder 21, and the lip L is oriented toward the inner air spring chamber 50. Each of the outward-facing seal members 66A, 66B also has a lip L slidably in contact with the inner periphery of the guide cylinder 21, and the lip L is oriented in the opposite direction from the inner air spring chamber 50 (toward the space 62).

Accordingly, this embodiment provides advantageous effects as described below.

(a) There are provided, on the outer periphery of the guide 23 of the guide rod 22, the inward-facing seal member 51, the outward-facing seal member 66 (66A, 66B), and the piston ring 24 which are arranged sequentially in this order along an axial direction of the guide 23 from the side close to the inner air spring chamber 50 to the side far from it.

According to this configuration, no abrasive dust from the piston ring 24 will move toward the inward-facing seal member 51, passing an outer periphery of the lip L of the outward-facing seal member 66 (66A, 66B), due to the orientation of the lip L. This prevents the inward-facing seal member 51 from being scratched by the abrasive dust from the piston ring 24, ensures the sealability of the inward-facing seal member 51, prevents leakage of air pressure from the inner air spring chamber 50, and maintains the spring force of the air spring in the inner air spring chamber 50 so that a suspension function is not impaired.

In addition, the abrasive dust from the piston ring 24 will not pass the outer periphery of the lip L of the outward-facing seal member 66 (66A, 66E) due to the orientation of the lip L. This prevents the outward-facing seal member 66 (66A, 66B) from being scratched by the abrasive dust from the piston ring 24, ensures the sealability of the outward-facing seal member 66 (66A, 66B), and prevents the lubricating oil in the lower part of the external cylinder from entering the inner air spring chamber 50, and hence prevents the air pressure in the inner air spring chamber 50 from rising to a critical pressure.

(b) The outward-facing seal member 66 (66A, 66B) described in (a) above is provided in plurality at a plurality of positions along an axial direction on the outer periphery of the guide 23 of the guide rod 22. This further prevents abrasive dust from the piston ring 24 from passing the outer peripheries of the lips L of the plurality of outward-facing seal members 66 (66A, 66B) which are arranged in series, and prevents more reliably the inward-facing seal member 51 and the outward-facing seal members 66 (66A, 66B) from being scratched by the abrasive dust from the piston ring 24.

(c) The vehicle body-side tube 11 and the axle-side tube 12 form the outer air spring chamber 60 at least on the outside of the inner air spring chamber 50 within the guide cylinder 21, and forms an oil chamber in a lower part of the outer air spring chamber 60, the oil chamber being filled with a lubricating oil. The features described in (a) and (b) make it possible to prevent a large amount of the lubricating oil in the lower part of the outer air spring chamber 60 from entering the inner air spring chamber 50.

Second Embodiment (FIGS. 5 to 8)

A spring leg 110 according to a second embodiment is substantially the same as the spring leg 10 according to the first embodiment. The spring leg 110 has no built-in damper but has a built-in suspension spring 120 formed of air springs (an air spring in an inner air spring chamber 130, an air spring in an outer air spring chamber 140, and an air spring in a rebound air spring chamber 150).

Figure 5:
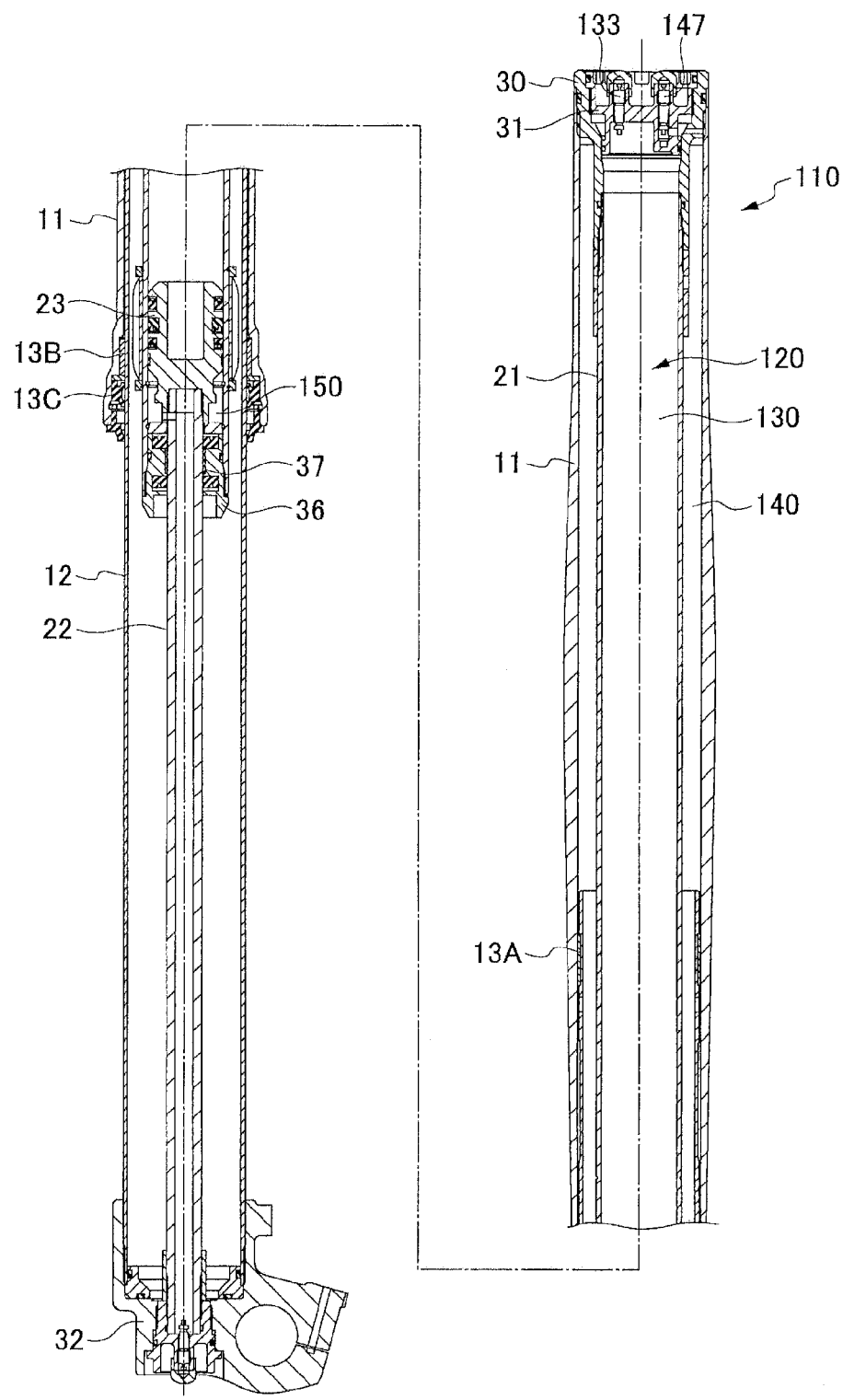
FIG. 5 is a general cross-sectional view showing a front fork spring leg according to a second embodiment.
Figure 6:
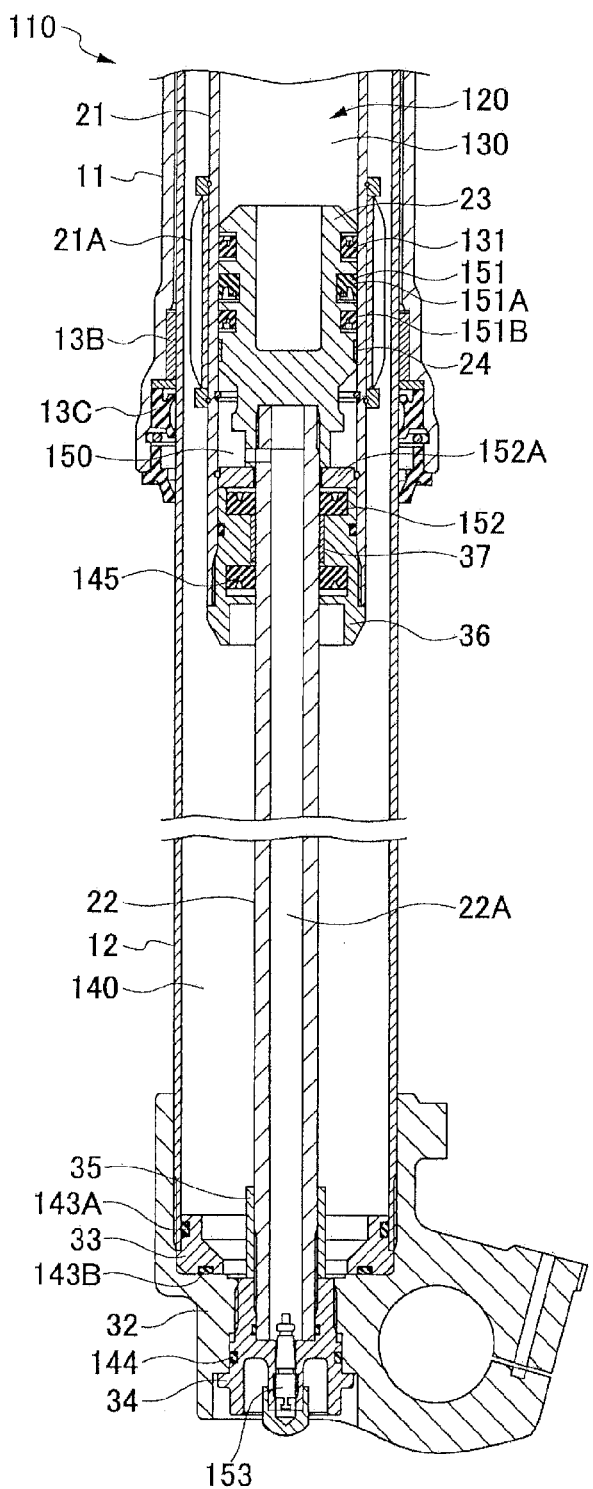
FIG. 6 is a cross-sectional view showing a lower part of FIG. 5.
Figure 7:
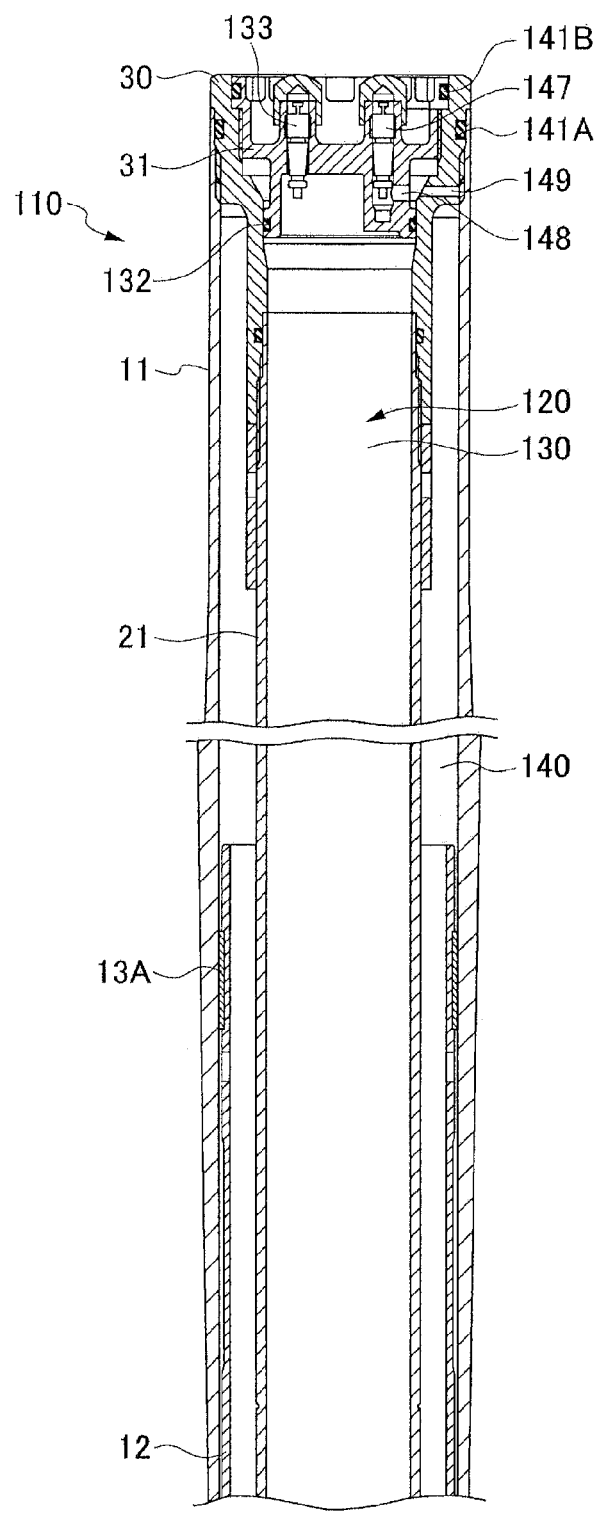
FIG. 7 is a cross-sectional view showing an upper part of FIG. 5.

As shown in FIGS. 5 to 7, the spring leg 110, except a suspension spring 120, is the same as the spring leg 10 according to the first embodiment. Therefore, like components are denoted by like reference numerals and description thereof will be omitted. The suspension spring 120 of the spring leg 110 is configured as described below.

The spring leg 110 has an inner air spring chamber 130 defined by the front end guide 23 of the guide rod 22 in the inside of the guide cylinder 21, and an outer air spring chamber 140 defined by the vehicle body-side tube 11 and the axle-side tube 12 on the outside of the inner air spring chamber 130 within the guide cylinder 21. The spring leg 110 further has, in the inside of the guide cylinder 21, a rebound air spring chamber 150 interposed and defined between the rod guide 36 provided on the guide cylinder 21 to receive and support the guide rod 22 inserted therein, and the front end guide 23 of the guide rod 22 inserted into the guide cylinder 21. Thus, the spring leg 110 forms the suspension spring 120 composed of the air spring in the inner air spring chamber 130, the air spring in the outer air spring chamber 140, and the air spring in the rebound air spring chamber 150.

The inner air spring chamber 130 is defined between the fork bolt 31 and the front end guide 23 of the guide rod 22, in the inside of the guide cylinder 21 on the side where the guide rod 22 is not located. The inner air spring chamber 130 is hermetically sealed by a seal member 131 provided on the front end guide 23 to face the inner periphery of the guide cylinder 21 and a seal member 132 provided on the fork bolt 31 to face the inner periphery of the cap 30.

An air pressure in the inner air spring chamber 130 is regulated by an inner air pressure regulator 133. The inner air pressure regulator 133 is formed of an air valve which is attached to the fork bolt 31 at a position facing outside and communicates with the inner air spring chamber 130, and regulates the air pressure sealed in the inner air spring chamber 130. The inner air pressure regulator 133 may be formed of a rubber film that can be perforated by a needle of an air pressure injector.

The outer air spring chamber 140 is a space defined by the vehicle body-side tube 11 and the axle-side tube 12 on the outside of the guide cylinder 21. The vehicle body-side tube 11 and the axle-side tube 12 hermetically slide with respect to each other via the aforementioned seal member 13C interposed between their sliding portions. An upper part of the outer air spring chamber 140 (including holes 148, 149 to be described later) is hermetically sealed by a seal member 141A provided on the cap 30 to face the inner periphery of the vehicle body-side tube 11 and a seal member 141B provided on the fork bolt 31 to face the inner periphery of the cap 30. A lower part of the outer air spring chamber 140 is hermetically sealed by seal members 143A, 143B provided on the bottom piece 33 to face the inner periphery of the axle-side tube 12 and the bottom face of the axle bracket 32, respectively, and a seal member 144 provided on the bottom bolt 34 to face the inner periphery of the axle bracket 32. The outer air spring chamber 140 is also hermetically sealed by a seal member 145 provided on the rod guide 36 to face the outer periphery of the guide rod 22.

An air pressure in the outer air spring chamber 140 is regulated by an outer air pressure regulator 147. The outer air pressure regulator 147 is formed of an air valve attached to the fork bolt 31 at a position facing the outside, and communicates with the outer air spring chamber 140 via a hole 148 formed in the fork bolt 31, an annular gap between the cap 30 and the fork bolt 31, and a hole 149 formed in the cap 30 to regulate the air pressure sealed in the outer air spring chamber 140. The outer air pressure regulator 147 may be formed of a rubber film that can be perforated by a needle of an air pressure injector.

The spring leg 110 forms an air spring with each of the inner air spring chamber 130 and the outer air spring chamber 140 compressed during a compression stroke. A spring force F1 of the air spring in the inner air spring chamber 130 and a spring force F2 of the air spring in the outer air spring chamber 140 bias the vehicle body-side tube 11 and the axle-side tube 12 in a direction to extend them.

The spring leg 110 can form an oil chamber filled with a lubricating oil, in a lower part of the outer air spring chamber 140. This lubricating oil lubricates the sliding portion between the vehicle body-side tube 11 and the axle-side tube 12, and the sliding portion between the guide cylinder 21 and the guide rod 22.

As described above, the spring leg 110 has, in the inside of the guide cylinder 21, the rebound air spring chamber 150 that is interposed and defined between the rod guide 36 provided in the guide cylinder 21 to receive and support the guide rod 22 inserted therein and the front end guide 23 of the guide rod 22 inserted into the guide cylinder 21. The rebound air spring chamber 150 is hermetically sealed by a seal member 151 provided on the front end guide 23 to face the inner periphery of the guide cylinder 21, and a seal member 152 provided on the rod guide 36 to face the outer periphery of the guide rod 22. The reference numeral 152A denotes a seal retainer.

An air pressure in the rebound air spring chamber 150 is regulated by a rebound air pressure regulator 153. The rebound air pressure regulator 153 is formed of an air valve attached to the bottom bolt 34 at a position facing the outside, and communicates with the rebound air spring chamber 150 via a hollow portion 22A in the guide rod 22 and a hole 154 formed in the front end guide 23 to regulate the air pressure sealed in the rebound air spring chamber 150. The rebound air pressure regulator 153 may be formed of a rubber film that can be perforated by a needle of an air pressure injector.

The spring leg 110 forms an air spring with the rebound air spring chamber 150 that is compressed on the extended side during an extension stroke. A spring force F3 of the air spring in the rebound air spring chamber 150 is compressed on the extended side where the vehicle body-side tube 11 and the axle-side tube 12 are biased by the spring forces F1, F2 of the air springs in the inner air spring chamber 130 and outer air spring chamber 140, and biases the vehicle body-side tube 11 and the axle-side tube 12 in a direction to compress them against the spring force F1 of the air spring in the inner air spring chamber 130 and the spring force F2 of the air spring in the outer air spring chamber 140.

Accordingly, in the front fork, a combined spring force F is generated during extension and compression strokes of the spring leg 110, the combined spring force F being obtained by summing up the spring force F1 of the air spring in the inner air spring chamber 130 and the spring force F2 of the air spring in the outer air spring chamber 140 which bias in a direction to extend the vehicle body-side tube 11 and the axle-side tube 12, and the spring force F3 of the air spring in the rebound air spring chamber 150 which biases the vehicle body-side tube 11 and axle-side tube 12 on the extended side in a direction to compress the same. The combined spring force F functions to increase the spring force in the second half of the compressed side without increasing the spring force in the initial to intermediate regions of the extended side of the extension and compression strokes.

The spring leg 110 is configured as described below in order to stably maintain the air spring characteristics.

As described above, the spring leg 110 has, on the outer periphery of the guide rod 22, a piston ring 24 and seal members 131, 151 which are slidably in contact with the inner periphery of the guide cylinder 21, and also has the inner air spring chamber 130 defined by the front end guide 23 of the guide rod 22 within the guide cylinder 21.

Figure 8:
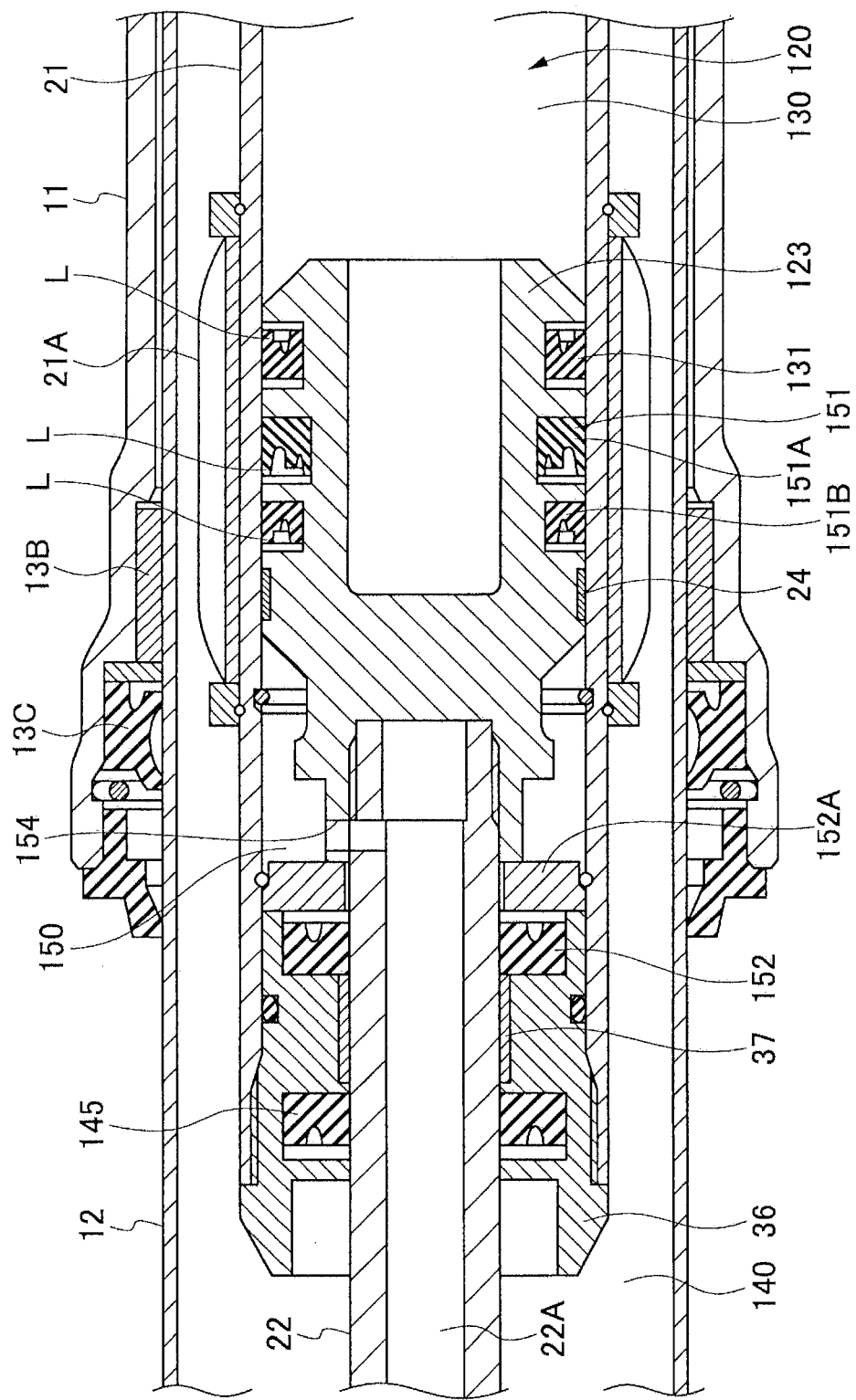
FIG. 8 is a schematic diagram showing a configuration of the outer periphery of a guide of a guide rod.

As shown in FIG. 8, the spring leg 110 thus has, on the outer periphery of the front end guide 23 of the guide rod 22, the inward-facing seal member 131, the outward-facing seal member 151, and the piston ring 24 arranged sequentially in this order along an axial direction of the guide 23 from the side close to the inner air spring chamber 130 toward the side far from it. In this embodiment, two (or three or more) adjacent outward-facing seal members 151A, 151B are provided as the outward-facing seal member 151, and these outward-facing seal members 151A, 151B are provided at two positions along an axial direction on the outer periphery of the front end guide 23. The inward-facing seal member 131, the outward-facing seal members 151A, 151B, and the piston ring 24 are embedded in respective annular grooves formed at four positions along an axial direction on the outer periphery of the front end guide 23. Two (or three or more) adjacent inward-facing seal members 131A, 131B (not shown) can be provided as the inward-facing seal member 131.

The inward-facing seal member 131 has a lip L which is slidably in contact with the inner periphery of the guide cylinder 21 and is oriented toward the inner air spring chamber 130. The outward-facing seal members 151A, 151B each have a lip L which is slidably in contact with the inner periphery of the guide cylinder 21 and is oriented in the opposite direction from the inner air spring chamber 130 (toward the space 150).

The second embodiment therefore provides advantageous effects as described below.

(a) There are provided, on the outer periphery of the guide 23 of the guide rod 22, the inward-facing seal member 131, the outward-facing seal member 151 (151A, 151B), and the piston ring 24 which are arranged sequentially in this order along the axial direction of the guide 23 from the side close to the inner air spring chamber 130 toward the side far from it.

According to this configuration, no abrasive dust from the piston ring 24 will move to the inward-facing seal member 131, passing an outer periphery of the lip L of the outward-facing seal member 151 (151A, 151B), due to the orientation of the lip L. This prevents the inward-facing seal member 131 from being scratched by the abrasive dust from the piston ring 24, ensures a sealability of the inward-facing seal member 131, prevents leakage of an air pressure from the inner air spring chamber 130, and maintains the spring force of the air spring in the inner air spring chamber 130 so that a suspension function is not impaired.

In addition, the abrasive dust from the piston ring 24 will not pass the outer periphery of the lip L of the outward-facing seal member 151 (151A, 151B) due to the orientation of the lip L. This prevents the outward-facing seal member 151 (151A, 151B) from being scratched by the abrasive dust from the piston ring 24, ensure a sealability of the outward-facing seal member 151 (151A, 151B), and prevents the lubricating oil in the lower part of the external cylinder from entering the inner air spring chamber 130, and hence prevents the air pressure in the inner air spring chamber 130 from rising to a critical pressure.

(b) The outward-facing seal member 151 (151A, 151B) described in (a) above is provided in plurality at a plurality of positions along the axial direction on the outer periphery of the guide 23 of the guide rod 22. This further prevents the abrasive dust from the piston ring 24 from passing the outer peripheries of the lips L of the plurality of outward-facing seal members 151 (151A, 151B) arranged in series, and prevents more reliably the inward-facing seal member 131 and the outward-facing seal members 151 (151A, 151B) from being scratched by the abrasive dust from the piston ring 24.

(c) The vehicle body-side tube 11 and the axle-side tube 12 have the outer air spring chamber 140 formed at least on the outside of the inner air spring chamber 130 within the guide cylinder 21, and the oil chamber filled with the lubricating oil is formed in the lower part of the outer air spring chamber 140. The features described in (a) and (b) make it possible to prevent a large amount of the lubricating oil in the lower part of the outer air spring chamber 140 from entering the inner air spring chamber 130.

(d) There is provided, in the inside of the guide cylinder 21, the rebound air spring chamber 150 which is interposed and defined between the rod guide 36 which is provided in the guide cylinder 21 to receive and support the guide rod 22 inserted therein, and the guide 23 of the guide rod 22 inserted in the guide cylinder 21. The features described in (a) and (b) above make it possible to prevent the abrasive dust from the piston ring 24 from passing the outer periphery of the outward-facing seal member 151 (151A, 151B) due to the air pressure in the rebound air spring chamber 150 which becomes high on the extended side during an extension stroke.

While the invention has been particularly described in its preferred embodiments with reference to the accompanying drawings, the invention is not limited thereto but may be otherwise variously embodied within the scope and spirit of the invention. It should be understood that all such modifications are intended to fall within the scope of the invention.

The invention provides a front fork spring leg including: a vehicle body-side tube and an axle-side tube inserted into each other; a guide cylinder provided at a central portion of the inside of either one of the vehicle body-side tube or the axle-side tube; a guide rod provided at a central portion of the inside of the other of the vehicle body-side tube and the axle-side tube, and having a guide inserted into the guide cylinder; a piston ring and a sealing member provided on an outer periphery of the guide of the guide rod so as to be slidably in contact with an inner periphery of the guide cylinder; and an inner air spring chamber formed in the inside of the guide cylinder by being defined by the guide of the guide rod. An inward-facing seal member, an outward-facing seal member, and the piston ring are arranged sequentially in this order along an axial direction of the guide on the outer periphery of the guide of the guide rod from the side close to the inner air spring chamber toward the side far from the same, and the inward-facing seal member has a lip that is slidably in contact with the inner periphery of the guide cylinder and oriented toward the inner air spring chamber, while the outward-facing seal member has a lip that is slidably in contact with the inner periphery of the guide cylinder and oriented in the opposite direction from the inner air spring chamber. This configuration enables the front fork spring leg to stably maintain the air spring characteristics.

EXPLANATION OF REFERENCE NUMERALS

10 Spring leg
11 Vehicle body-side tube
12 Axle-side tube
21 Guide cylinder
22 Guide rod
23 Guide
24 Piston ring
36 Rod guide
40 Suspension spring
50 Inner air spring chamber
51 Inward-facing seal member
60 Outer air spring chamber
66 (66A, 66B) Outward-facing seal member
110 Spring leg
120 Suspension spring
130 Inner air spring chamber
131 Inward-facing seal member
140 Outer air spring chamber
150 Rebound air spring chamber
150 (151A, 151B) Outward-facing seal member

What is claimed is:

1. A front fork spring leg comprising:
a vehicle body-side tube and an axle-side tube inserted into each other;
a guide cylinder provided at a central portion of an inside of one of the vehicle body-side tube and the axle-side tube;
a guide of a guide rod provided at a central portion of an inside of the other one of the vehicle body-side tube and the axle-side tube, with the guide being inserted into the guide cylinder;
a piston ring and, an inward-facing seal member and at least one outward-facing seal member provided on an outer periphery of the guide of the guide rod so as to be slidably in contact with an inner periphery of the guide cylinder; and
an inner air spring chamber formed in an inside of the guide cylinder by being defined by the guide of the guide rod, wherein
the inward-facing seal member, the at least one outward-facing seal member, and the piston ring are arranged on the outer periphery of the guide of the guide rod sequentially in this order along an axial direction of the guide from a side close to the inner air spring chamber toward a side far from the inner air spring chamber; and
the inward-facing seal member has a lip that is slidably in contact with the inner periphery of the guide cylinder, the lip of the inward-facing seal member being oriented toward the inner air spring chamber, and
the at least one outward-facing seal member has a lip that is slidably in contact with the inner periphery of the guide cylinder, the lip of the at least one outward-facing seal member being oriented in an opposite direction to the inner air spring chamber.

2. The front fork spring leg according to claim 1, wherein the vehicle body-side tube and the axle-side tube form an outer air spring chamber at least on an outside of the inner air spring chamber within the guide cylinder, and an oil chamber filled with a lubricating oil is formed in a lower part of the outer air spring chamber.

3. The front fork spring leg according to claim 2, further comprising, in the inside of the guide cylinder, a rebound air spring chamber interposed and defined between a rod guide provided on the guide cylinder to receive and support the guide rod inserted in the rod guide, and the guide of the guide rod inserted in the guide cylinder.

4. The front fork spring leg according to claim 1, wherein the at least one outward-facing seal member further includes a plurality of outward-facing seal members, said members are provided at a plurality of positions along an axial direction on an outer periphery of the guide of the guide rod.

5. The front fork spring leg according to claim 4, wherein the vehicle body-side tube and the axle-side tube form an outer air spring chamber at least on an outside of the inner air spring chamber within the guide cylinder, and an oil chamber filled with a lubricating oil is formed in a lower part of the outer air spring chamber.

6. The front fork spring leg according to claim 4, further comprising, in the inside of the guide cylinder, a rebound air spring chamber interposed and defined between a rod guide provided on the guide cylinder to receive and support the guide rod inserted in the rod guide, and the guide of the guide rod inserted in the guide cylinder.

7. The front fork spring leg according to claim 1, further comprising, in the inside of the guide cylinder, a rebound air spring chamber interposed and defined between a rod guide provided on the guide cylinder to receive and support the guide rod inserted in the rod guide, and the guide of the guide rod inserted in the guide cylinder.

* * * * *